Patented Apr. 15, 1930

1,754,577

UNITED STATES PATENT OFFICE

JULIUS WALDO SMITH, OF MADISON, MINNESOTA

ROOT-CANAL FILLER

No Drawing. Application filed August 17, 1928. Serial No. 300,389.

The object of my invention is to produce a plastic, adherent mass of germicidal qualities which will remain in the canal for an indefinite period and prevent infection.

My composition consists of a liquid and a powder. The liquid is oil of cloves, and the powder is the sodium salt of tetra-iodo-phenolphthalein.

The function of the sodium salt of tetra-iodo-phenolphthalein combined with oil of cloves is to form a plastic mass with set. This it does to a marked degree. The mass even when very stiff will not crumble but can be rolled to a small cone shaped point. This property of being able to form a cone shaped point is very valuable as it permits of the easy insertion of the same in the root canals. The set is important for permanence.

The germicidal properties of the ingredients tend to kill the germs in the root canal or at the apex of the root.

This mass can be forced into the peri-apical areas. It is absorbable making it possible to form a peri-apical seal which in a few months will absorb flush with the root apex.

The combination of the sodium salt of tetra-iodo-phenolphthalein with the oil of cloves is I believe entirely new and the working properties obtained are far superior to any dental cement for filling root canals.

A small amount of the powder is drawn into the liquid and thoroughly spatulated. More is added until the mass is very stiff. It will be found to be very adhesive, and with a clean spatula and slab it is easily rolled into cones or points which in turn are inserted into and worked to the apex of the root canal.

Subsequent points are added until the operator is satisfied that the canal is filled. This mass has a slow brittle set.

It is possible to add other ingredients in small quantities to the formula without destroying this property of adhesiveness or set. These may or may not add to its efficiency as a germicide or root filler.

Oil of cloves when spatulated with the bromin salt of tetra-iodo-phenolphthalein will form a similar mass. It will be noted that this is the same compound with the sodium content replaced with bromin. Iodine, bromine, chlorine and fluorine all belonging to the halogen group of elements can be used as the salt of tretra-iodo-phenolphthalein.

What I claim as new and original is:

1. A dental cement comprising oil of cloves and the sodium salt of tetra-iodo-phenolphthalein.

2. A dental cement comprising oil of cloves and a halogen metal salt.

JULIUS WALDO SMITH.